Figure 4:
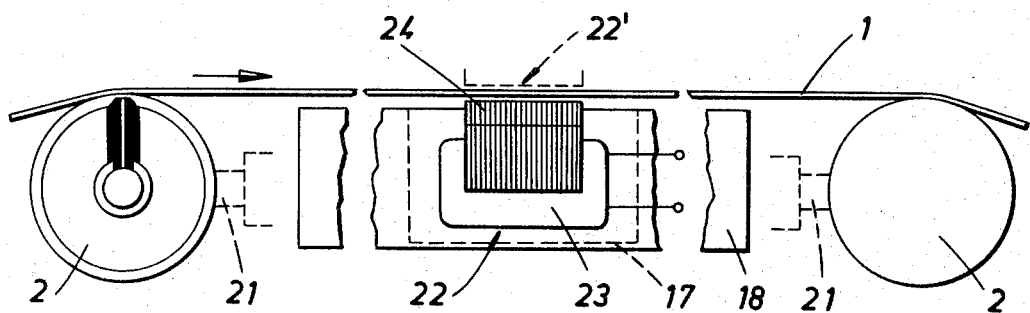

United States Patent [19]

Schwenzfeier et al.

[11] 3,850,031
[45] Nov. 26, 1974

[54] PROCESS AND APPARATUS FOR DETERMINING THE VARIATION OF TENSILE STRESSES IN COLD-ROLLED STRIP OVER THE WIDTH THEREOF

[75] Inventors: Werner Schwenzfeier; Manfred Gfrerer; August Herzog, all of Leoben, Austria

[73] Assignee: Vereinigte Osterreichische Eisen-und Stahlwerke-Alpine Montan Aktiengesellschaft, Vienna, Austria

[22] Filed: Sept. 7, 1973

[21] Appl. No.: 395,294

[30] Foreign Application Priority Data

May 23, 1973 Austria ............................. 4468/73

[52] U.S. Cl. .................................... 73/143, 73/159
[51] Int. Cl. ............................................. G01l 1/10
[58] Field of Search ............. 73/67.2, 95, 95.5, 159, 73/143, 144

[56] References Cited
UNITED STATES PATENTS
3,394,587  7/1968  Freeman ............................. 73/143
3,741,334  6/1973  Kaule ............................. 73/67.2 X Primary Examiner—James J. Gill
Attorney, Agent, or Firm—Kurt Kelman

[57] ABSTRACT

The strip is pulled over two parallel supports, which are spaced in and extend transversely to the longitudinal direction of the strip. Each of a plurality of longitudinal zones of said strip between said supports is excited to vibrate at its natural frequency by means which are out of contact with the strip. The vibration of each of said longitudinal zones at its natural frequency is detected by means which are out of contact with said strip. Signals are generated which are representative of the frequency of said detected vibration of each of said longitudinal zones as a measure of the tensile stress in said longitudinal zone.

30 Claims, 20 Drawing Figures

3,850,031
FIG.1
FIG.2
FIG.3
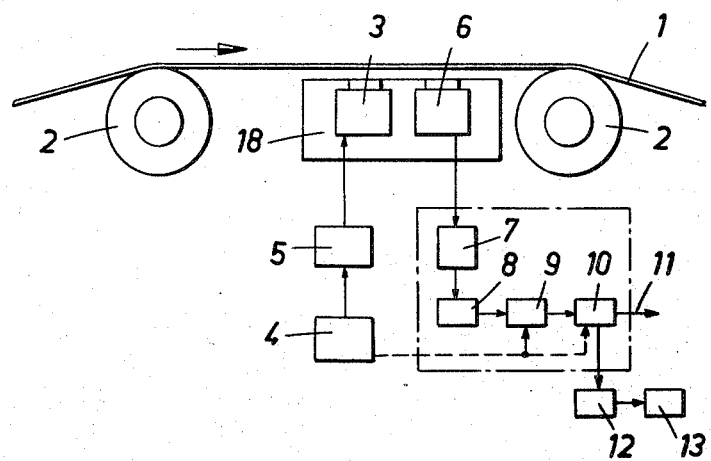
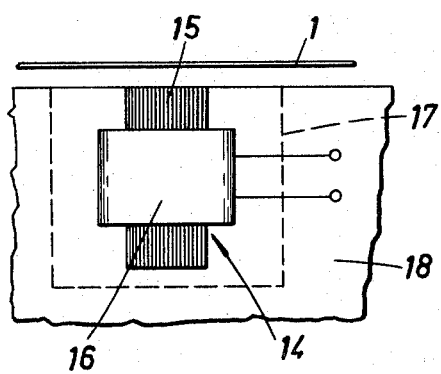
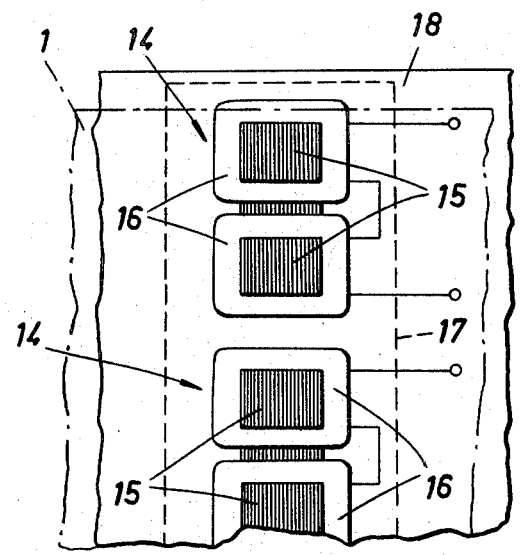

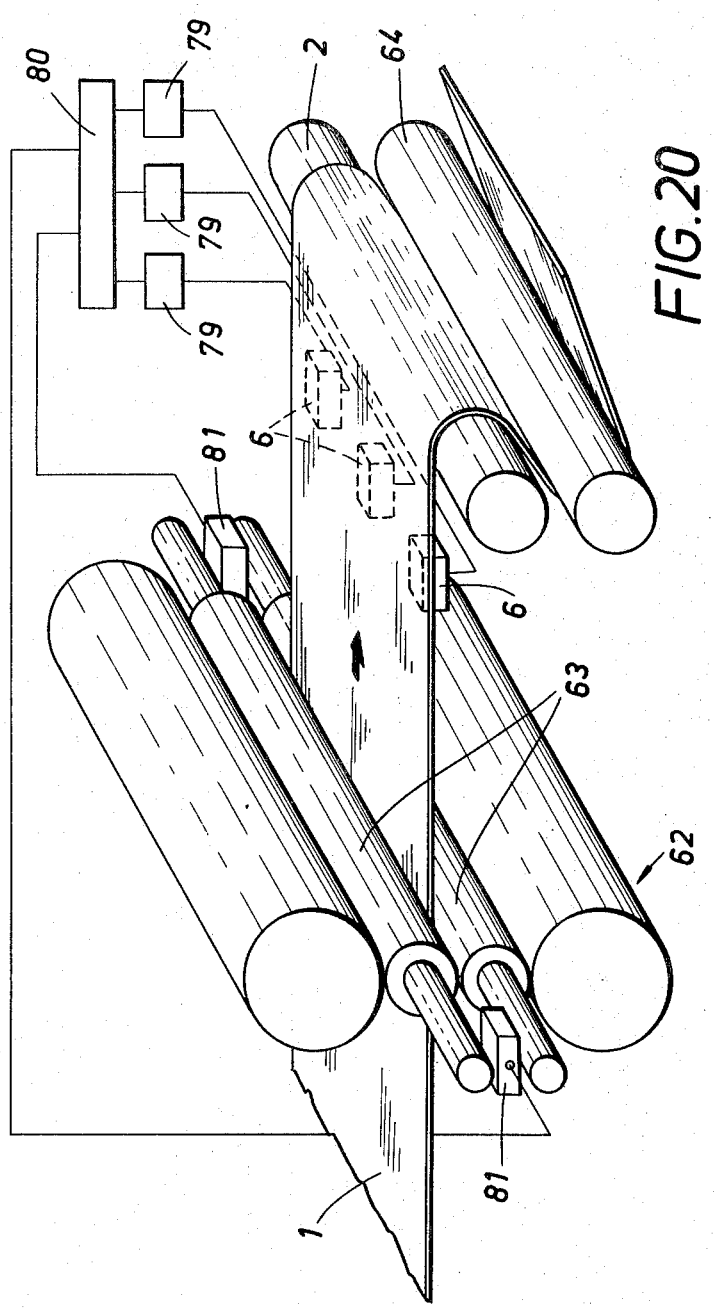

PROCESS AND APPARATUS FOR DETERMINING THE VARIATION OF TENSILE STRESSES IN COLD-ROLLED STRIP OVER THE WIDTH THEREOF

This invention relates to a process of determining the variation of tensile stresses in cold-rolled strip over the width thereof by non-contacting measurements carried out adjacent to longitudinal zones of the strip, and apparatus for carrying out the process.

Cold-rolled strip is now required to have a high dimensional accuracy, and special consideration must be given to the planarity of the strip. Non-planarity will mainly arise when the inevitable thickness variations across the width of the strip are to be eliminated by cold-rolling. In that case, the thicker portions of the strip are stretched more than the thinner ones so that the different extensions of the various longitudinal zones result in the formation of waves.

To ensure that the planarity of a strip will be within the specified tolerance limits, the planarity of the strip must be determined by measurement so that suitable control actions can be taken in the rolling mill stands. There are basically two ways of determining the planarity of a strip. Either the thickness of the strip can be measured across the width of the strip before and behind the rolling mill stand and conclusions be drawn from the thickness variations to the extension of the strip, or the variation of tensile stresses in the strip over the width thereof can be determined because the different extensions of the strip result in different tensile stresses. The determination of the planarity of a cold-rolled strip by a determination of the thickness variations across the width of the strip before and after the pass cannot be carried out as accurately as would be required because the conventional instruments for measuring the thickness of the strip cannot measure the thickness of the strip with the high accuracy which is required in view of the small differences in thickness. From the aspect of accuracy of measurement it is more desirable to determine the variation of tensile stresses in the strip over the width thereof because the stresses arising in the strip as a result of its differential extension exhibit a much larger variation so that they can better be determined by measurement than the comparatively small thickness variations.

To determine the variation of tensile stresses in cold-rolled strip over the width thereof, the strip is pulled around a deflecting roller and the radial pressure force acting on the periphery of the roller is measured in several zones. For this reason, the deflecting roller is divided into several axially succeeding measuring zones and the pressure force arising in each zone is measured independently of the adjacent zones. The measured variation of pressure forces in the axial direction of the deflecting roller corresponds to the distribution of the tension of the strip across its direction of travel and for this reason can be used to determine the variation of tensile stresses in the strip. On the other hand, this known process of determining the variation of tensile stresses in cold-rolled strip over the width thereof has the disadvantage that the sensing rollers must constantly contact the cold strip. This requirement results in a complicated operation and in mechanical wear. Besides, the several measuring zones have a considerable inertia and the sensing roller may be destroyed, e.g., in case of a rupture of the strip.

To avoid these disadvantages, it has been proposed (East German Patent Specification No. 79,864) to utilize the magnetic anisotropy which arises in a steel strip as a result of the rolling of strip portions differing in thickness for the determination of the variation of the tensile stresses. For this purpose, a plurality of inductive voltage generators are provided, which are spaced apart across the strip and spaced from the surface of the strip so that the different magnetic conditions permit of a determination of the different tensile stresses adjacent to the several voltage generators. To eliminate errors in measurement as far as possible, care must be taken that the distance between the strip and the voltage generators is always the same; for this reason, backing rollers must be provided adjacent to each voltage generator. Nevertheless, a vibration of the moving strip is inevitable and will modify the result of measurement. As a result, the accuracy which can be achieved with that known apparatus is not sufficient to enable the planarity to be kept within the small tolerances which are specified. Another disadvantage resides in that the apparatus can be used only to test ferromagnetic strip.

In another known process (German Patent Specification No. 1,141,099), strip metal is subjected to resonant vibration. That process is used for a non-destructive testing of the material and cannot be used to determine the variation of tensile stresses in the strip. In such process, the nodal lines of the vibration are rendered visible to indicate where the otherwise uniform vibration of such strip is disturbed by faults, such as cracks or shrinkage cavities, and the nodal lines which deviate from the normal course permit also of a conclusion to the location of the fault. To render the nodal lines visible, sand is scattered on the strip; this sand concentrates adjacent to the nodal line when the strip is vibrated. Narrow beams of light which are obliquely incident on the surface of the strip may be used instead of the sand to render the nodal lines visible. Owing to the oblique incidence, the points of incidence of the light beams oscillate on the surface adjacent to the vibration antinodes at the frequency of the resonant vibration whereas non-moving, defined strips of light are formed adjacent to the nodal lines, which do not move relative to the light beams.

It is an object of the invention to provide a process of determining the variation of tensile stresses in cold-rolled strip over the width thereof so as to enable a measurement of the variation of the tensile stresses with simple means and with the required accuracy and without restriction to a certain strip material. Besides, the apparatus required to carry out the process should not be subjected to a particularly high wear or risk of damage.

In a process of the kind described first hereinbefore, this object is accomplished according to the invention in that the strip is vibrated between at least two parallel supports extending transversely to the longitudinal direction of the strip, as is known per se, and the natural frequencies of the various longitudinal zones of the strip or measured quantities derived from the natural frequencies are used as a measure of the tensile stresses. The process according to the invention is based on the fact that the natural frequency of a member stressed in tension varies in proportion to the tensile stress in the member. To measure the variation of the tensile stresses, the strip is divided into a plurality of longitudinal zones. It is assumed in a coarse approximation that each longitudinal zone can vibrate between the parallel supports independently of the other zones. Actually the several zones of the strip cannot vibrate freely because they are interconnected. Experiments have shown, however, that the influence of the transverse interaction on the natural frequency of each longitudinal zone remains the same through a large stress or natural frequency range because the mode of vibration is not changed so that the error which is due to the transverse interaction can be properly anticipated and corrected. When the vibration in the strip is excited at the edge thereof, a smaller portion of the strip will vibrate than when the vibration is excited at the center of the strip. If the tensile stresses at the edge and at the center of the strip are the same, a lower natural frequency will be measured in the central portion than at the edge of the strip because a smaller mass of the strip will vibrate at the center than adjacent to the edges of the strip.

To enable a determination of the natural frequency of each longitudinal zone of the strip, the latter must be subjected to corresponding vibration. This can be accomplished with strip of any desired material so that the process according to the invention enables a determination of the variation of tensile stresses across the longitudinal direction of the strip without a restriction due to the nature of the material.

To enable a determination of the natural frequency of each longitudinal zone of the strip, it is within the scope of the invention to subject the strip to an impulse excitation of vibration and then to determine the frequencies of the several zones of the strip or measured quantities derived from the natural frequencies when the strip is allowed to vibrate freely. After the impulse excitation, the strip will be subjected to a transient and will then vibrate freely at its resonant frequency. The natural frequencies measured in the several longitudinal zones of the strip are used as a measure of the tensile stresses in these longitudinal zones. It will be understood that it is not necessary to measure the natural frequency itself for a determination of the variation of the tensile stresses because it is sufficient to record quantities, such as voltages, which are derived from the natural frequencies.

In another method of determining the natural frequencies within the scope of the invention, the strip is excited to vibrate with a constant amplitude at a changing frequency and those frequencies are determined which result in a rise of the amplitude of the vibration in a given strip zone. When the excitation frequency reaches the range of the natural frequency of a longitudinal zone of the strip, there will be a resonant rise of the amplitude of the vibration in said zone. For this reason, an amplitude rise permits of a conclusion that the respective zone vibrates at its natural frequency so that it will be sufficient to record that excitation frequency which results in an amplitude rise in order to determine the natural frequency.

Finally, it is within the scope of the invention to amplify the amplitude of existing vibrations of the strip, e.g., vibrations which are due to the travel of the strip, and to determine said amplitude-increased vibrations in several zones so as to determine the natural frequency and tensile stress in each zone. When the strip is left to itself, only resonant vibration occurs, which must be amplified so that it can be properly determined.

The transverse interaction between the vibrating longitudinal zones of the strip will mainly depend on the ratio of the length of these zones to the width of the strip. Desirable conditions will usually be obtained if the width of the strip is approximately as large as the length of each strip zone or the distance between the supports. When relatively narrow strips are tested for planarity, it will be sufficient in most cases to determine the tensile stresses in the central portion and the two edge portions of the strip. In order to suppress the transverse interaction on the vibration as far as possible, it is a feature of the invention to excite vibration in the two edge zones in alternation with the central zone so that a transverse interaction between directly adjacent zones is avoided.

On the other hand, the alternating excitation of vibration to the central zone and the edge zones involves the disadvantage that a continuously moving strip cannot be monitored continuously. To enable a continuous monitoring of the planarity of a strip, it is a feature of the invention that the strip is subjected to vibration simultaneously in two length portions in such a manner that only alternate longitudinal zones are vibrated in one length portion and the intervening longitudinal zones are vibrated in the other length portion so that there will again be no interaction between directly adjacent zones.

According to another feature of the invention, all longitudinal zones of the strip are excited to vibrate simultaneously in such a manner that directly adjacent zones are subjected to different excitation frequencies. This will also substantially suppress the interaction between the vibrations in several zones because the interval of time between the first occurrence of resonant vibration in adjacent zones is increased. Moreover, that process permits of an indication of the natural frequencies of the zones of one group by their fundamental oscillation and of the natural frequencies of the other zone by their harmonics.

An apparatus for carrying out the process comprises vibration exciters disposed approximately midway between the strip-supporting rollers and is characterized according to the invention in that a vibration exciter and a vibration receiver are associated with each longitudinal zone of the strip and, if desired, at least one strip-supporting roller is adjustable in the longitudinal direction of the strip. The association of a vibration exciter and a vibration receiver with each longitudinal zone of the strip ensures that vibration is excited in each longitudinal zone of the strip and the resonant frequency determined by the vibration receiver actually corresponds to the natural frequency of the associated longitudinal zone of the strip. Because at least one strip-supporting roller can be adjusted in the longitudinal direction of the strip, the length of the vibrated portion of the strip or of each zone of the strip may be adjusted to the width of the strip. Such adaptation is required only when strips which differ in thickness and/or width are to be tested.

For testing strips of different widths, it is generally not necessary to change the number of longitudinal zones; in this case, the width of each zone must be changed. For this purpose it is a further feature of the invention that the vibration exciters and the vibration receivers are individually displaceable transversely to the longitudinal direction of the strip to vary their spacing.

A simple structure of the apparatus according to the invention will be accomplished if the vibration exciters, which are arranged one beside the other and parallel to the surface of the strip, and the vibration receivers, which are also arranged one beside the other, are accommodated in a common measuring table. The common measuring table permits of the desired arrangement of the vibration receivers close to the vibration exciters. In this case, the vibration receivers can be shielded from the vibration exciters without difficulty. It is desired to excite vibration in the strip and to sense the vibration of the strip as closely as possible to the largest amplitude of the vibration; on the other hand, the vibration exciters should not act directly on the vibration receivers.

Within the scope of the invention, a.c. solenoids having pole pieces directed toward the strip may be used as vibration exciters for testing of electrically conducting strip. When the strip to be tested is of ferromagnetic material, the force of attraction of the solenoid on the ferromagnetic material is utilized to excite the vibration. In such case the strip connects the pole pieces of the a.c. solenoid and may be considered as a magnetic yoke. When it is desired to test a strip which is not ferromagnetic but electrically conducting, the vibration may also be excited by these a.c. solenoids because the magnetic stray field extending from pole piece to pole piece traverses the strip and gives rise to eddy currents so that the strip must be considered as an electric conductor in a magnetic field and is subjected to a force which pulsates in dependence on the frequency of the current with which the a.c. solenoids are excited.

In the testing of strip which is not ferromagnetic but electrically conducting, the force acting on an electric conductor in a magnetic field may be utilized to excite vibration within the scope of the invention in that the vibration exciters consist of a.c. solenoids having pole pieces directed toward the strip and the strip is connected to a d.c. source by means of the supporting rollers, which are provided with slip rings. In dependence on the frequency of the current with which the solenoids are excited, the strip acting as a conductor is attracted and repelled and subjected to a corresponding vibration.

Because the force acting on a conductor will increase with the strength of the magnetic field which contains the conductor, a further feature of the invention resides in that pairs of a.c. solenoids are provided, which are in register on opposite sides of the plane of the strip and electrically connected in parallel, and those solenoids which are disposed on one side of the plane of the strip are adapted to be lifted from the strip. Because there are pairs of registering a.c. solenoids, the stray field of said solenoids is moved into the plane of the strip so that the stray fields will be well utilized. To facilitate the handling of the strip, e.g., when it is threaded, those solenoids which are disposed on one side of the strip can be lifted off.

When an impulse excitation of vibration in the strip is desired, a plurality of conducting bars may be provided, which are associated with respective longitudinal zones of the strip and extend in the longitudinal direction of the strip approximately midway between the supports, and a pulse generator may be connected to the strip by the supporting rollers provided with slip rings and to the conducting bars. In response to a current pulse, both conductors, namely, the conducting bars and the strip, are attracted or repelled, depending on their polarity, so that vibration is excited in the strip because the conducting bars are fixed.

To ensure in a simple manner that the current distribution in the conducting strip is as uniform as possible, it is a further feature of the invention that the supporting rollers are provided adjacent to respective longitudinal zones of the strip with coaxial copper rings, which are electrically conductively connected to the slip rings so that a good, low-loss electrical connection is provided between the strip and the slip rings.

The previously described vibration exciters will fail if the strip to be tested consists of non-conducting or poorly conducting material. For testing such strip, the vibration exciters may consist according to the invention of compressed-air nozzles, in which the air flow can be modulated, e.g., by vibrating diaphragms. It will be understood that the use of such vibration exciters is not restricted to non-conducting strip because they may be used with strip of any kind.

The vibration receivers may consist according to the invention of inductive or capacitive receivers. It will be understood that inductive receivers will be used only with ferromagnetic strip.

To detect the vibration, the changes in inductance or capacitance due to the changes of the distance between the fixed receiver and the vibrating strip may be utilized in accordance with the invention, or the sound waves radiated from the vibrating strip may be received by microphones for producing corresponding oscillations.

In another embodiment of the invention, each vibration receiver consists of a photodetector, which receives a light beam that has been reflected by the vibrating strip. In that case, the changes in the intensity of light of the light beam portion which is incident on the photodetector are used as a measure of the vibration of the strip. The reflection of the light beam falling on the strip is varied by the vibration of the strip so that the reflected light beam vibrates adjacent to the photodetector in response to the vibration of the strip.

When it is desired to amplify an existing vibration of the strip for a determination of the natural frequency of each strip zone, it is a further feature of the invention to arrange the vibration receivers so that they drive the vibration exciters through respective amplifiers, and to connect an amplitude limiter and preferably a filter, which succeeds the amplitude limiter, between each vibration receiver and the amplifier associated therewith. The always existing vibration of the strip pulled over the supporting rollers is detected by the vibration receiver and amplified by the vibration exciters so that the vibration is subjected to a resonant rise. To limit that resonant rise, an amplitude limiter is provided between the vibration receiver in order to prevent a further resonant rise and possible destruction of the strip. It will be sufficient to amplify the vibration to such an extent that its frequencies can be satisfactorily determined. When the peak amplitudes of the vibration are clipped by the amplitude limiter because the amplitudes exceed the upper limit, the sinusoidal fundamental vibration will be strongly distorted and there will mainly be a strong third harmonic. To enable a simple and satisfactory determination of the frequency, it will be desirable to provide behind the amplitude limiter a filter which transmits substantially only the fundamental oscillation rather than the harmonics.

If the existing vibration of the strip is amplified and the vibration exciters consist of a.c. solenoids, the latter must have an additional d.c. winding because the force exerted by the a.c. solenoid varies as the square of the exciting current. The square of a sinusoidal vibration is a double-frequency vibration so that the vibration excited in the strip would have a frequency which is twice the frequency of the original vibration of the strip and there could be no resonant rise of the vibration of the strip so as to enable a measurement of the natural frequencies because the strip would always be excited to vibrate at twice its natural frequency. On the other hand, if the a.c. solenoid has an additional d.c. winding, the force acting on the strip will be proportional to the square of the sum of the alternating and direct currents and will have a component which varies with the product of the direct and alternating currents and pulsates at the frequency of the exciting alternating current. That component of force may be increased by the direct current so that the provision of an additional d.c. winding in the a.c. solenoid enables an excitation of vibration in the strip at the natural frequencies of the several zones.

When the natural frequencies of the several longitudinal zones of the strip are determined in that the amplitude rise is detected which occurs when the vibration exciter reaches the natural frequency, it is a feature of the invention that the vibration exciters are connected to a frequency generator, each vibration receiver is succeeded by a signal generator which is responsive to a rise of the vibration amplitude above an adjusted threshold value, and a storage device is provided, which under control of the signal generator stores that vibration frequency which has been measured when the threshold value has been exceeded. In that case, the variation of the tensile stresses in the strip over the width thereof may be determined in that the storage device is sampled, in which an indication of the natural frequency of each strip zone has been stored because during a variation of frequency through the selected range each longitudinal zone was excited at its natural frequency. The vibration frequencies which accompany the amplitude rise can be very easily detected because they correspond to the excitation frequencies.

To enable a reliable determination of the natural frequency of each strip zone, it is a feature of the invention that the signal generator is preceded by a filter, which transmits substantially only the fundamental frequency to the signal generator and suppresses any existing harmonic.

Figure 5:
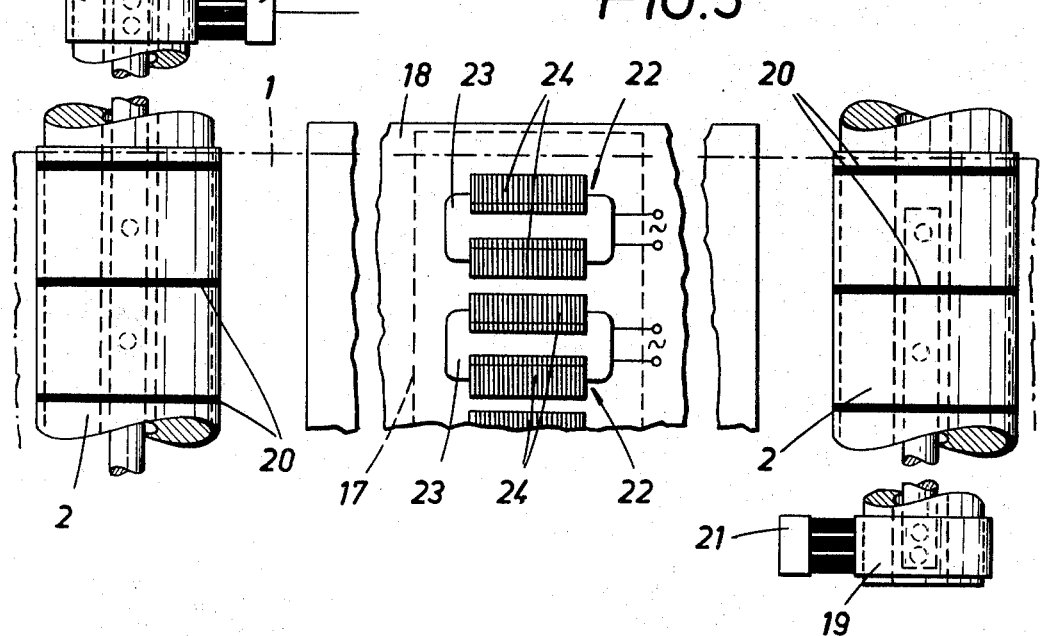
Figure 6:
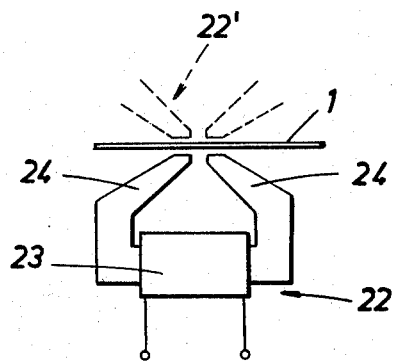
Figure 7:
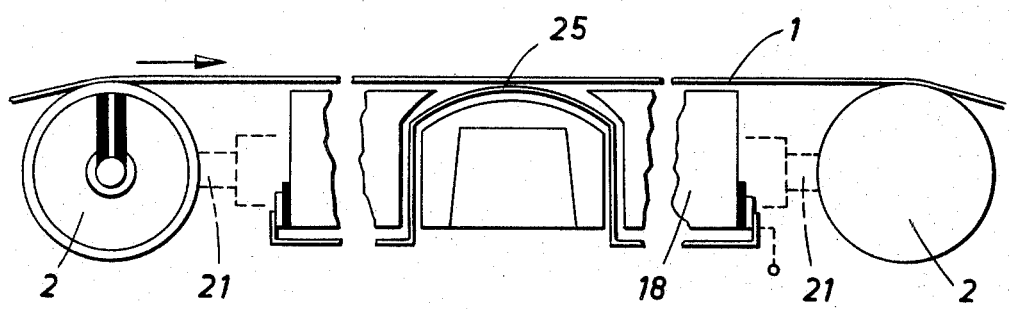
Figure 8:
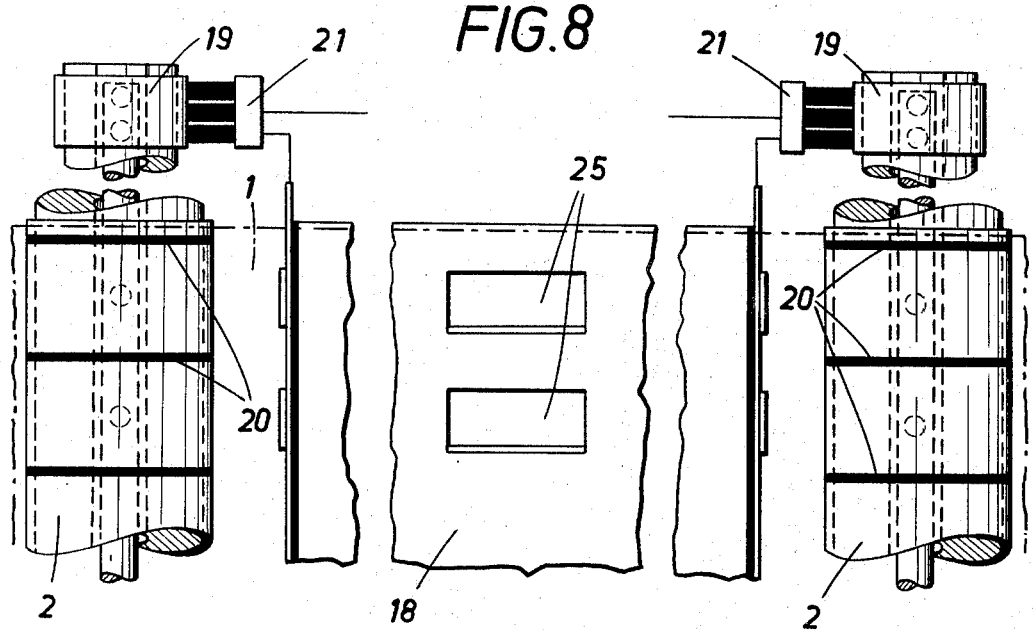
Figure 9:
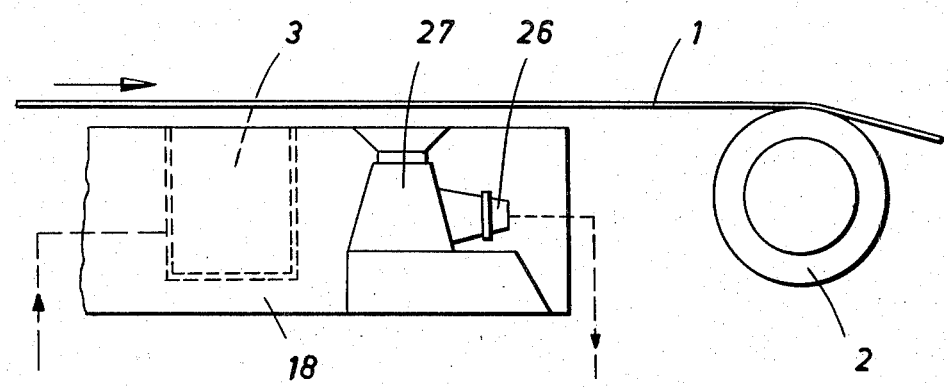
Figure 10:
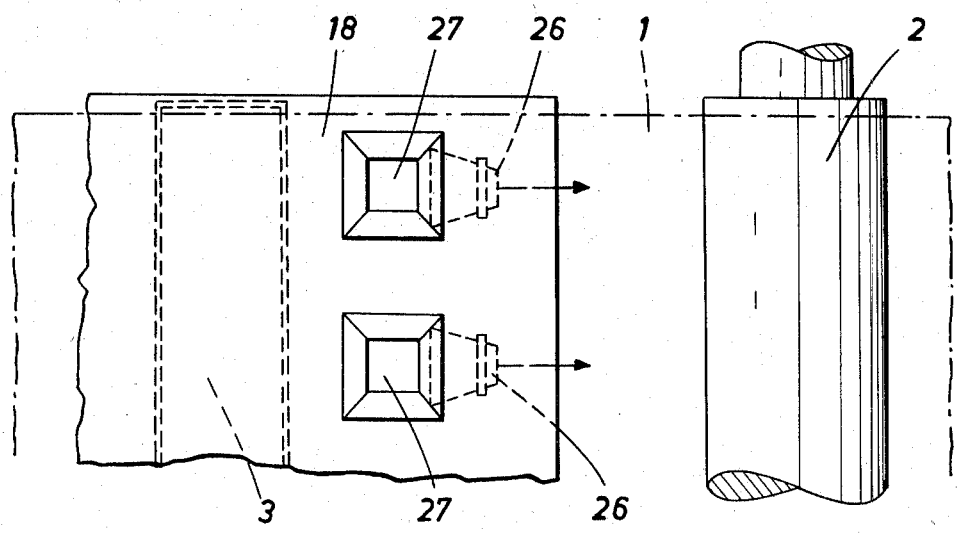
Figure 11:
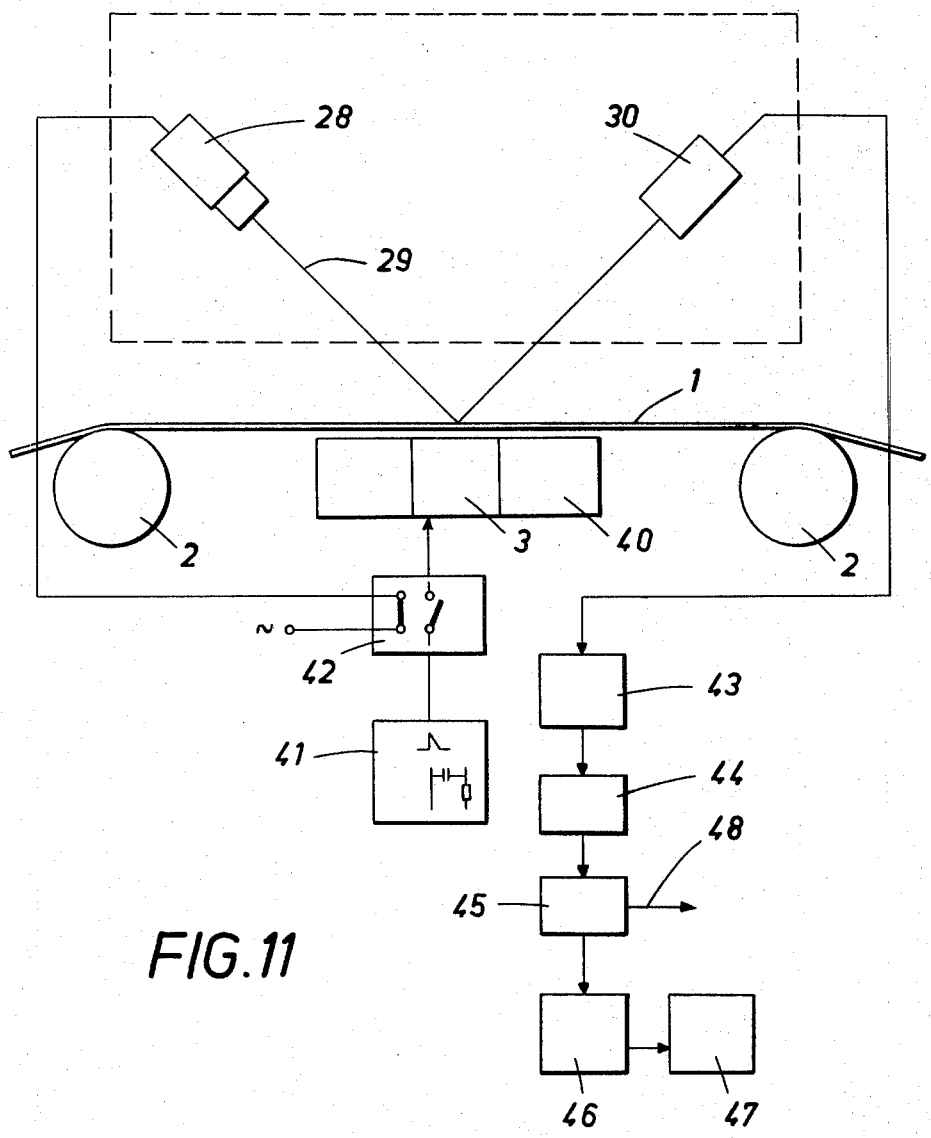
Figure 12:
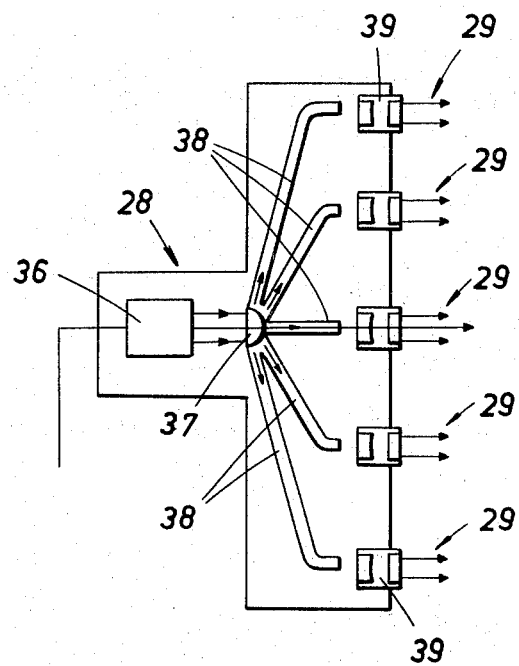
Figure 13:
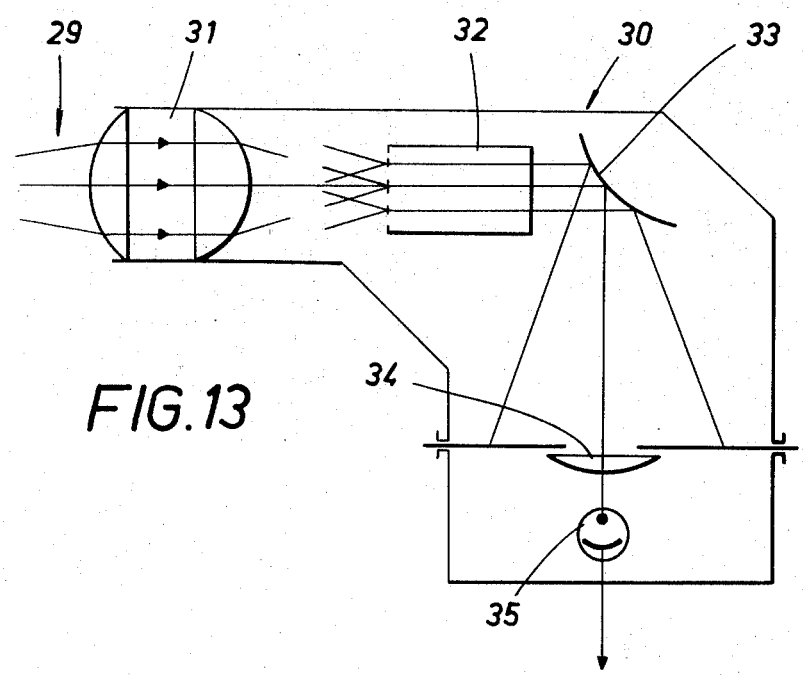
Figure 14:
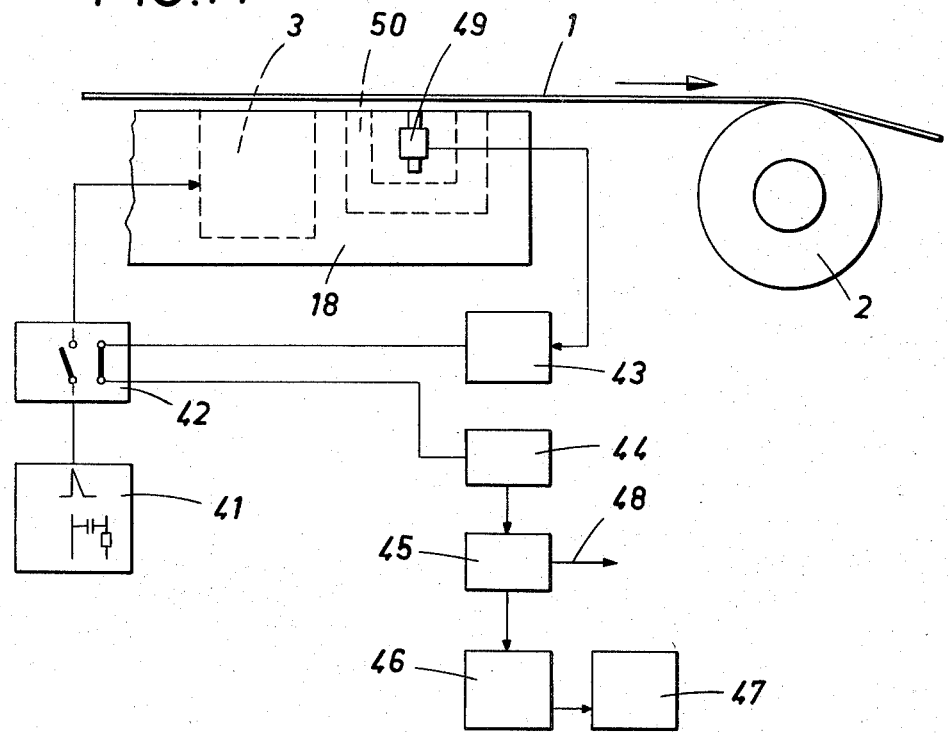
Figure 15:
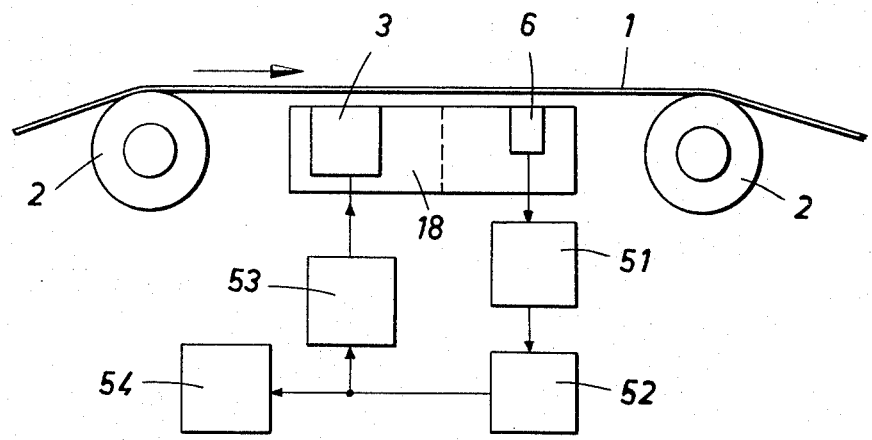

Various embodiments of apparatus for carrying out the process according to the invention are diagrammatically shown on the accompanying drawings, in which FIG. 1 is a diagrammatic side elevation showing the basic arrangement of an apparatus according to the invention, FIG. 2 is a side elevation showing the arrangement of a.c. solenoids for exciting vibration in ferromagnetic strip, FIG. 3 is a top plan view showing the arrangement of the solenoids, FIG. 4 is a side elevation showing an apparatus for exciting vibration in a non-ferromagnetic, electrically conducting strip, which is connected to a d.c. source, FIG. 5 is a top plan view showing the apparatus of FIG. 4, FIG. 6 shows an embodiment of an a.c. solenoid for apparatus according to FIGS. 4 and 5, FIGS. 7 and 8 are, respectively, a side elevation and a top plan view showing an apparatus for an impulse excitation of vibration in an electrically conducting strip, FIGS. 9 and 10 are, respectively, a diagrammatic sectional view and a top plan view showing the arrangement of microphones serving as vibration receivers in a measuring table, FIG. 11 is a side elevation showing an apparatus for an impulse excitation of vibration in the strip, comprising optical vibration receivers, FIG. 12 is a diagrammatic sectional view showing the light transmitter associated with the optical vibration receivers, FIG. 13 is a longitudinal sectional view showing an optical receiver, FIG. 14 is a side elevation showing an apparatus which comprises inductive or capacitive vibration receivers, FIG. 15 shows the basic arrangement of an apparatus for amplifying vibration which exists in the strip, e.g., as a result of its travel, so that the natural frequencies can be determined.

Figure 16:
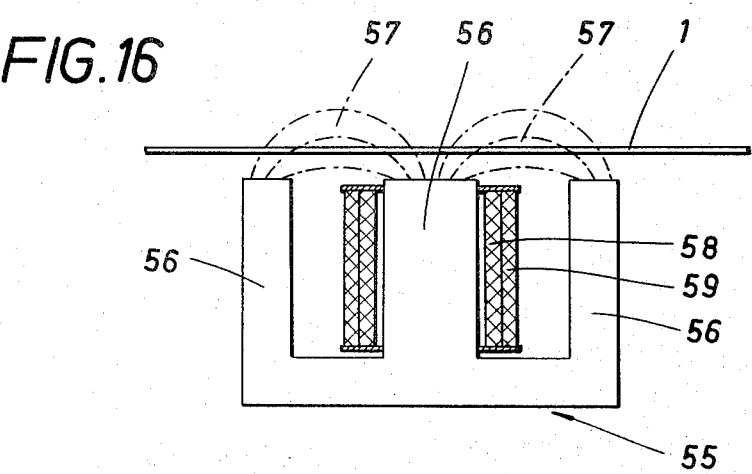
Figure 17:
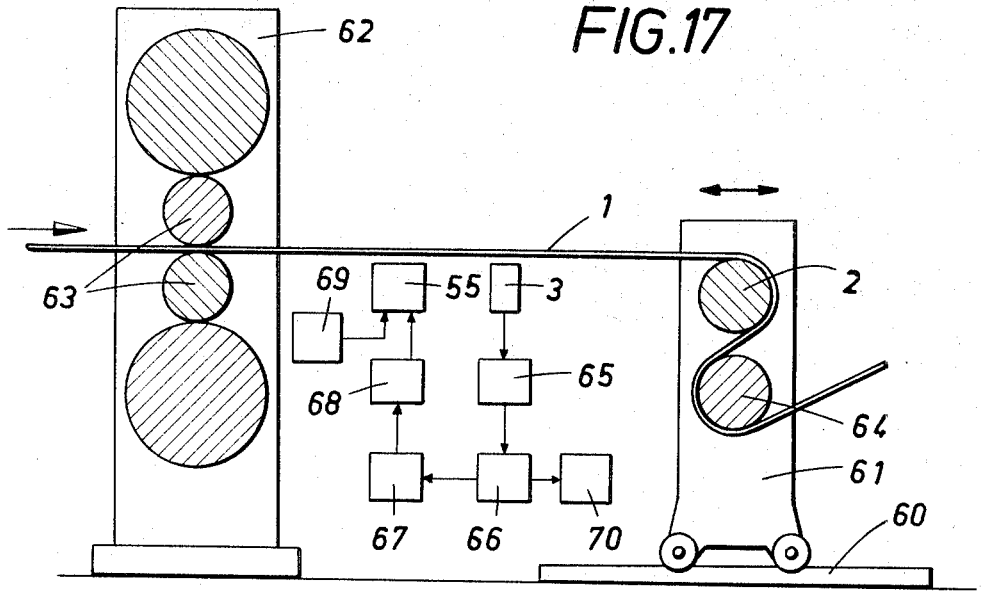
Figure 18:
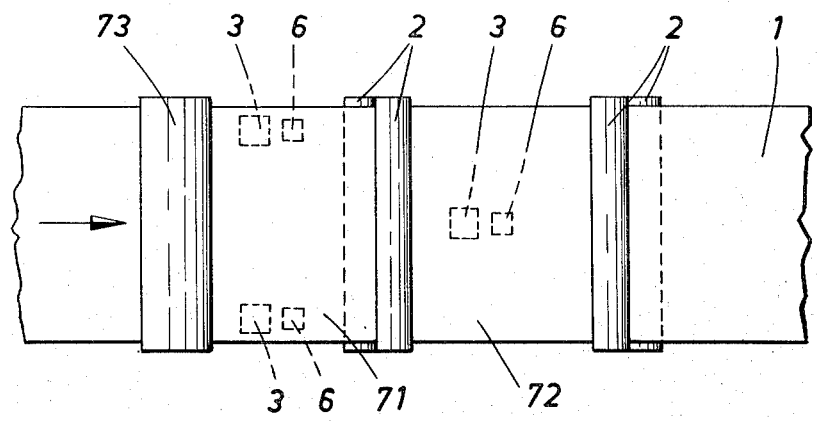
Figure 19:
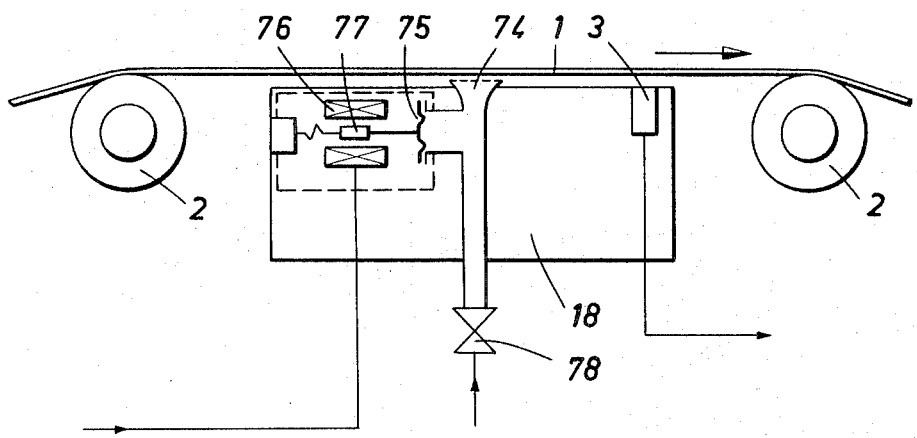

FIG. 16 shows an a.c. solenoid for exciting vibration in a conducting, non-ferromagnetic strip, FIG. 17 is a diagrammatic longitudinal sectional view showing an apparatus for adjusting the supporting rollers, FIG. 18 is a top plan view showing an apparatus in which vibration is excited in two successive length portions of the strip, FIG. 19 is a diagrammatic sectional view showing an apparatus for exciting vibration in the strip by compressed air, and FIG. 20 is a diagrammatic perspective view showing an arrangement for controlling the roll nip in the rolling mill stand in response to the variation of the tensile stresses transversely to the longitudinal direction of the strip.

According to FIG. 1, the strip 1 which is to be tested as to its planarity is pulled in the direction of the arrow over two spaced apart supporting rollers 2 and is vibrated between these two supporting rollers 2. For this purpose, a plurality of vibration exciters 3 are provided, which are spaced apart transversely to the longitudinal direction of the strip and disposed approximately midway between the two supports. The vibration exciters 3 are fed by a frequency generator 4 through a power amplifier 5 and excite vibration in each of several longitudinal zones of the strip 1. A vibration receiver 6 is associated with each vibration exciter 3 and detects the vibration of the strip and transmits a corresponding oscillation to a measuring amplifier 7. The measuring amplifier 7 is succeeded by a filter 8, which transmits substantially only the basic oscillation of the composite oscillation received whereas the harmonics are suppressed. The resulting fundamental oscillation is applied to a signal generator 9, which is responsive to a rise of the amplitude of the oscillation above an adjusted threshold value. The response of said signal generator causes an indication of the instantaneous exciting frequency delivered by the frequency generator 4 to be stored in a storage device 10. This process of determining the natural frequency of each longitudinal zone of the strip is based on the fact that there will be an amplitude rise when the frequency of the exciting vibration reaches the natural frequency of a longitudinal zone. These amplitude rises are detected by the signal generator 9, and an indication of the respective excitation frequency is stored so that the natural frequencies of all longitudinal zones of the strip have been stored when the frequency has been varied through a certain range of, e.g., 20–500 cycles per second. The variation of tensile stresses across the strip will then be indicated if the storage device is sampled. Signals corresponding to the stored quantities may be supplied by the conduit 11 to a device for controlling the roll nip. A frequency indicator 12 and a recorder 13 are also connected to the storage device 10 to permit of a direct reading of the natural frequencies.

According to FIGS. 2 and 3, the vibration exciters consist of U-shaped a.c. solenoids 14, which have polepieces 15 directed toward the strip. The strip 1 consists of ferromagnetic material and acts as a yoke, which closes the magnetic circuit of the solenoids 14 so that the strip will be attracted and repelled in each of the longitudinal zones associated with the respective solenoids at the frequency of the exciting current flowing in the exciting windings 16. To avoid an influence on inductive vibration receivers, magnetic field-confining shielding means 17 indicated by dotted lines are provided. As is clearly apparent from FIG. 1, the solenoids 14 and the vibration receivers are accommodated in a common measuring table 18 and the vibration exciters and the vibration receivers can be adjusted transversely to the longitudinal direction of the strip for a simple adaptation to strips of different widths.

According to FIGS. 4 to 8, the supporting rollers 2 are provided adjacent to their ends with slip rings 19, which are electrically connected to copper rings 20 arranged adjacent to respective longitudinal zones of the strip. The slip rings 19 cooperate with brushes 21 so that the strip 1 can be connected to a d.c. source by the copper rings 20, the slip rings 19 and the brushes 21. A U-shaped a.c. solenoid 22 is provided at the center of the length of each zone of the strip and is provided with an exciting winding 23. These solenoids excite vibration in the electrically conducting strip. Such apparatus is particularly suitable to excite vibration in conducting strip which is non-ferromagnetic, e.g., strip aluminum. The stray field which closes the magnetic circuit between the two pole pieces 24 is intersected by the conducting strip 1, which is thus subjected to a corresponding pulsating force to vibrate at the frequency of the exciting current for the a.c. solenoids 22.

The stray field which connects the two pole pieces will be concentrated adjacent to the strip if additional a.c. solenoids, indicated in the drawings by dotted lines at 22', are provided on the other side of the plane of the strip so that pairs of solenoids are provided and the effective magnetic field is moved into the region of the plane of the strip and is well utilized. The threading of the strip between the solenoids will be facilitated if the solenoids 22' can be lifted from one side of the strip.

According to FIGS. 7 and 8 an impulse excitation of vibration in the electrically conducting strip 1 is enabled in that a conducting bar 25 extending in the longitudinal direction of the strip is associated with each longitudinal zone of the strip and disposed approximately midway between the supporting rollers 2 and is connected to a pulse generator, not shown, to which the strip 1 is also connected by the copper rings 20, the slip rings 19, and the brushes 21. In response to a current pulse, the strip 1 will be attracted or repelled by the conducting bars, depending on the polarity of the conducting bars and the strip, which is thus subjected to an impulse excitation of vibration. When the strip is allowed to vibrate freely, each of its longitudinal zones will vibrate at its natural frequency so that the same can be determined in that the frequency of the free vibration is measured.

FIGS. 9 and 10 show an arrangement of microphones 26 serving as vibration receivers. The sound waves radiated from the vibrating strip 1 are conducted to the microphones 26 by acoustic funnels 27 provided in the measuring table 18 and by the microphones are converted into electric signals. Because the sound waves radiated from the vibrating strip correspond to the vibration of the strip in frequency and amplitude, these sound waves may also be used as a measure of the vibration of the strip.

FIGS. 11 to 13 show how the vibration of the strip can be optically detected. A light transmitter 28 emits individual light beams 29 obliquely against the surface of the strip 1, which reflects each beam to a receiver 30. The receiver 30 comprises an inlet lens system 31, which focusses the received light beam to the inlet range of a glass fiber bundle 32, which serves to transmit the focussed light beam parallel to its axis to a convex mirror 33. The light which has been deflected by the mirror 33 is transmitted by a positive lens 34 to a photodetector 35, which generates electric signals corresponding to the intensity of light. As the light beams are reflected by the vibrating strip 1, they are modulated by the motion of the strip so that the light beam falling on the inlet lens system 31 of each receiver 30 oscillates transversely to the direction in which it is propagated. As a result of this oscillation of the light beam in accordance with the vibration of the strip, the mirror 33 deflects the light beam in different directions and the light which is directed by the positive lens 34 to the photodetector 35 varies in intensity at the frequency of the vibration of the strip.

To eliminate the need for a separate light source for each receiver, the light from one light source 36 is distributed according to FIG. 12 by a negative lens 37 among a plurality of glass fiber bundles 38, which are succeeded by lens system 39, which produce the light beams 29 emitted by the transmitter 28.

The vibration is excited by a suitable exciting system 3, which is accommodated in a table 40. The strip is subjected to an impulse excitation of vibration by a pulse generator 41. In response to the connection of the pulse generator the receiving system is deenergized by a switch 42 so that the vibration receiver and the means connected thereto are protected. After the impulse excitation of the strip 1, the pulse generator is disconnected and the receiving system is energized and the free resonant vibration of the strip detected. For this purpose, the electric signals delivered by the vibration receiver 30 are amplified by an amplifier 43 and are then fed to a filter 44, which transmits substantially only the fundamental oscillation of the composite oscillation received. A succeeding transducer 45 produces a signal which represents the frequency of the fundamental oscillation and which may be fed to a suitable indicator 46 and a recorder 47 as well as by a lead 48 to means for controlling the roll nip of the proceding rolling mill stand.

FIG. 14 shows an arrangement which is similar to that of FIG. 11. The difference resides mainly in the nature of the vibration receiver, which according to FIG. 14 consists of an inductive receiver 49. For this reason the strip 1 must consist of ferromagnetic material. To avoid an influence of the vibration exciter 3 on the inductive receiver 49 so as to introduce an error into the measurement, the receivers are protected from the influence of the vibration exciter by shielding means 50 for confining the magnetic field. The output voltage of the receiver 49 has been modulated by the vibration of the strip 1 and is again fed through an amplifier 43 and a filter 44 to a transducer 45, which produces a signal that is proportional to the frequency of vibration and is fed either to an indicator 46 and a recorder 47 or by a lead 48 to control means. To prevent the vibration receivers from detecting also the impulse excitation, which could result in destruction, a switch 42 is again provided which deenergizes the vibration receivers 49 when the pulse generator 41 is connected to the vibration exciters.

To enable the zonewise excitation of the strip 1 at its natural frequency, the slight vibration always existing in the strip is detected according to FIG. 15 by the vibration receivers 6, each of which delivers oscillations that are fed through an amplifier 51 to a filter 52. The oscillation appearing at the output of the filter corresponds to the fundamental oscillation of the detected vibration of the strip and is utilized to drive a power amplifier 53, which precedes a vibration exciter. As a result, the strip is excited at its resonant frequency and its vibration builds up so that the natural frequency can be satisfactorily detected, e.g., by a frequency indicator 54.

In electrically conducting strip of non-ferromagnetic material, vibration can also be excited by an a.c. solenoid 55 (FIG. 16). The pole pieces 56 of such vibration exciter are directed to the surface of the strip 1 and the stray field 57 connecting said stray field is intersected by the strip 1 so that eddy currents are produced in the electrically conducting strip. As a result of the interactions between the magnetic field and the eddy currents, the strip is attracted and repelled and is thus caused to vibrate. Because the action of force on the strip is proportional to the square of the exciting current, a d.c. exciting winding 59 must be provided in addition to the a.c. exciting winding 58 if the strip is to vibrate at the frequency of the exciting alternating current. The square of a sinusoidal oscillation is a double-frequency oscillation so that the force action changes also at twice the frequency of the exciting alternating current when there is only an a.c. winding. If a d.c. winding is provided in addition to the a.c. winding, the force action will be proportional to the square of the sum of the exciting direct current and the exciting alternating current. The square of a sum includes a component which is twice the product of the summands so that a force action which corresponds to said component changes at the frequency of the exciting alternating current. The direct current can be selected so that said component is so large that only said component of force is of practical significance. In this case the a.c. solenoid can be used to excite the strip to vibrate at the frequency of the exciting alternating current if an additional d.c. winding which is suitably dimensioned is additionally provided.

To adjust the length of the vibrated portion of the strip in a simple manner to the width and thickness of the strip, one of the supporting rollers 2 is mounted in a frame 61, which is movable with rollers on rails 60. Depending on the position of the frame 61, the strip vibrates in a larger or smaller length so that the interaction between the vibrations of the several longitudinal zones of the strip can be kept within permissible limits. The second support consists of the rolling mill stand 62 with its working rolls 63. This affords the advantage that the planarity of the strip 1 is tested very close to the working rolls and that a control action which is required as a result of such check will be effective on the strip portion in which a fault has been detected.

A second roller 64 for deflecting the strip 1 is provided to prevent a propagation of the vibration of the strip beyond the supporting roller 2.

According to FIG. 17, vibration receivers 3 detect existing vibrations of the strip, which may be due to the pull exerted on the strip, and deliver corresponding oscillations to respective matching transformers 65, which match the vibration receivers to the respective succeeding measuring amplifiers 66. An amplified oscillation is fed from each measuring amplifier 66 to an amplitude limiter 67, which is succeeded by a filter, which delivers an output signal at the fundamental frequency of the composite oscillation received by the filter. Said output signal is used to drive a power amplifier 68 preceding the corresponding vibration exciter 55. These vibration exciters consist of a.c. solenoids having an additional d.c. winding, which is fed by a d.c. source 69.

The amplitude limiter 67 limits the resonant rise of the strip 1 because an unlimited amplitude rise would result in damage. It will be sufficient if the strip vibrates with an amplitude which is so large that the frequency of the vibration can be satisfactory determined by a frequency meter 70. As soon as the amplitude of the vibration of the strip has reached a certain value, the power amplifier 68 is not driven further so that the strip continues to vibrate at the maximum amplitude. Because the clipping of the amplitude results in a distortion of the vibration, the amplitude limiter 67 is succeeded by a filter, which suppresses the harmonics, which are due to the clipping of the amplitudes, and transmits substantially only the fundamental oscillation.

The interaction between the vibrations in individual longitudinal zones of the strip depends on the thickness of the strip and of the spacing of the vibration exciters and should be sufficiently small even in narrow strip. For this purpose, the strip 1 in the arrangement shown in FIG. 18 is excited to vibrate simultaneously in two successive length portions 71, 72 in such a manner that only the edge zones of the strip are vibrated in the portion 71 and only the intervening central longitudinal zone of the strip is vibrated in the portion 72. The two vibrating portions 71, 72 are limited by suitable supporting rollers 2 and by the rolling mill stand 73 and an interaction of the vibrations in the two portions is suppressed in that the supporting rollers form pairs of deflecting rollers. The arrangement shown in FIG. 18 has mainly the advantage that the planarity can be continuously measured.

FIG. 19 shows how vibration can be excited in non-conducting strip. The vibration exciters consist of compressed-air nozzles 74, in which the air flow is modulated by diaphragms 75, which are vibrated by a.c. coils 76. Each of these coils is connected to an iron core 77, which is connected to the associated diaphragm and displaceable in the longitudinal direction of the coil. To reduce the pressure, a reducing valve 78 is incorporated in the compressed-air conduit.

FIG. 20 shows diagrammatically how the nip between the working rolls 63 of the rolling mill stand can be controlled by means of the apparatus according to the invention. The vibration receivers 6 detect the natural frequencies of the several strip zones and produce oscillations which in the associated transducers 79 are converted into signals that are proportional to the natural frequencies of the respective strip zones and used as inputs for a control device 80. The latter serves to control means 81 for bending the working rolls so as to change the nip in such a manner that the variations of the tensile stresses across the strip are eliminated and a planar strip is produced. The vibration exciters associated with the respective vibration receivers 6 are not shown in the perspective view for the sake of clearness.

What is claimed is:

1. A process of determining the variation of the tensile stresses in cold-rolled strip over the width thereof, which comprises
    pulling said strip over two parallel supports, which are spaced in and extend transversely to the longitudinal direction of the strip,
    exciting each of a plurality of longitudinal zones of said strip between said supports to vibrate at its natural frequency by means which are out of contact with the strip,
    detecting the vibration of each of said longitudinal zones at its natural frequency by means which are out of contact with said strip, and
    generating signals which are representative of the frequency of said detected vibration of each of said longitudinal zones as a measure of the tensile stress in said longitudinal zone.

2. A process as set forth in claim 1, in which each of said longitudinal zones is subjected to impulse excitation and is subsequently allowed to vibrate freely at its natural frequency.

3. A process as set forth in claim 1, in which
    each of said longitudinal zones is subjected to an excitation having a constant amplitude and a frequency which varies within a range that includes the natural frequency of each longitudinal zone, and
    an amplitude rise of the vibration in each of said longitudinal zones is detected as an indication that the frequency at which said longitudinal zone is then excited is its natural frequency.

4. A process as set forth in claim 1, which comprises
    detecting the vibration in each of said longitudianl zones of said strip and
    exciting each of said longitudinal zones to vibrate at the frequency of said detected vibration to build up the amplitude thereof.

5. A process as set forth in claim 1, in which each of three longitudinal zones, consisting of two edge zones and one central zone, of said strip is excited between said supports to vibrate at its natural frequency by means which are out of contact with the strip and in such a manner that said edge zones are excited in alternation with said central zone.

6. A process as set forth in claim 1, in which each of a plurality of longitudinal zones of said strip between said supports is excited to vibrate at its natural frequency by means which are out of contact with the strip and in such a manner that only alternate ones of said length portions are thus excited in a first length portion of said strip between said supports and the remaining length portions are thus excited in a successive second length portion of said strip between said supports.

7. A process as set forth in claim 1, in which all of said longitudinal zones of said strip between said supports are simultaneously excited to vibrate in such a manner that adjacent ones of said longitudinal zones are excited at different frequencies.

8. Apparatus for determining the variation of the tensile stresses in cold-rolled strip over the width thereof, while said strip is moved by being pulled in its longitudinal direction on a predetermined path, which apparatus comprises
    two parallel supports which are spaced along and extend transversely to said path and adapted to engage said strip when the same moves on said path,
    a plurality of vibration exciters, which are disposed one beside the other between said supports and closely spaced from said path, each of said exciters being operable to excite an associated longitudinal zone of said strip to vibrate at its natural frequency when said exciter is out of contact with said strip,
    a plurality of vibration receivers, which are disposed one behind the other between said supports and closely spaced from said path, each of said receivers being aligned with one of said exciters in the longitudinal direction of said path and adapted to detect a vibration in the associated longitudinal zone of said strip at its natural frequency when said receiver is out of contact with said strip, and
    a plurality of signal generators, each of which is connected to one of said signal receivers and operable to generate signals which are representative of the frequency of said detected vibrations of the associated longitudinal zone as a measure of the tensile stress in said longitudinal zone.

9. Apparatus as set forth in claim 8, in which said supports consist of rollers.

10. Apparatus as set forth in claim 8, in which said vibration exciters are disposed approximately midway between said supports.

11. Apparatus as set forth in claim 8, in which at least one of said supports is adjustable along said path.

12. Apparatus as set forth in claim 8, in which
    said exciters are aligned transversely to said path,
    said receivers are aligned transversely to said path, and
    said exciters and receivers are mounted on a common measuring table.

13. Apparatus as set forth in claim 8, in which each of said exciters and each of said receivers is adjustable transversely to said path.

14. Apparatus as set forth in claim 8 for use with electrically conducting strip, in which each of said vibration exciters consist of an a.c. solenoid having pole pieces directed toward said path.

15. Apparatus as set forth in claim 8 for use with electrically conducting, non-ferromagnetic strip, in which
each of said exciters comprises an a.c. solenoid having pole pieces directed toward said path,
a d.c. source is provided, and
said supports consist of rollers comprising electrically conducting means connected to said d.c. source and adapted to contact a strip moving on said path, said electrically conducting means comprising slip rings.

16. Apparatus as set forth in claim 15 in which
each of said exciters comprises a pair of registering a.c. solenoids which are electrically connected in parallel and disposed on opposite sides of said path and have pole pieces directed toward said path, and
those of said solenoids which are disposed on one side of said path are adapted to be moved further away from said path.

17. Apparatus as set forth in claim 8, which is operable to subject each of said longitudinal zones to impulse excitation and then to allow each zone to vibrate freely at its natural frequency, in which apparatus
said supports consist of rollers comprising electrically conducting means adapted to contact a strip moving on said path, said electrically conducting means comprising slip rings,
each of said exciters consists of a conducting bar which extends along said path approximately midway between said rollers, and
a pulse generator is electrically connected to said conducting bars and to said slip rings.

18. Apparatus as set forth in claim 15, in which said electrically conducting means comprise a plurality of copper rings, which are spaced apart along said roller and electrically connected to said slip rings and adapted to contact said strip moving on said path, and each of said copper rings is aligned with one of said exciters in the longitudinal direction of said path.

19. Apparatus as set forth in claim 8, in which each of said exciters consists of a compressed-air nozzle comprising modulating means for modulating a stream of air flowing through the nozzle.

20. Apparatus as set forth in claim 19, in which said modulating means comprise vibratable diaphragms.

21. Apparatus as set forth in claim 8, in which said receivers are inductive receivers.

22. Apparatus as set forth in claim 8, in which said receivers are capacitive receivers.

23. Apparatus as set forth in claim 8, in which said receivers comprise microphones.

24. Apparatus as set forth in claim 8, in which
each of said receivers comprises a photodetector and light-transmitting means are provided which are operable to direct a plurality of light beams onto respective ones of said longitudinal zones of said strip between said supports for reflection onto respective ones of said photodetectors.

25. Apparatus as set forth in claim 8, in which
each of said exciters is preceded by an amplifier adapted to drive said exciter, and
each of said receivers has an output connected by an amplitude limiter to the input of one of said amplifiers.

26. Apparatus as set forth in claim 25, in which a filter is connected between each amplitude limiter and the amplifier associated therewith.

27. Apparatus as set forth in claim 25, for use with electrically conducting strip, in which
each of said exciters consists of a solenoid having pole pieces directed toward said path and provided with an a.c. winding and with a d.c. winding.

28. Apparatus as set forth in claim 8, in which
a frequency generator is provided, which is operable at a frequency which varies within a range that includes the natural frequencies of all said longitudinal zones,
said exciters are frequency-controlled by said frequency generator and operable to subject said longitudinal zones of said strip to an excitation having a constant amplitude,
each of said receivers is succeeded by a signal generator which is arranged to generate a signal in response to a rise of the amplitude of the vibration of the associated longitudinal zone above a predetermined value, and
a storage device is provided, which is adapted to receive said signal and in response thereto to store in association with the respective longitudinal zone an indication of the frequency at which the frequency generator is then operated.

29. Apparatus as set forth in claim 28, in which a filter is connected between each of said receivers and the succeeding signal generator.

30. Apparatus as set forth in claim 28, in which said signal generators are adjustable to vary said predetermined value.

* * * * *